July 22, 1958 J. F. BYRNE ET AL 2,844,711

MULTIPLE FREQUENCY CHANNEL MULTIPLEX COMMUNICATION SYSTEM

Filed June 8, 1953 3 Sheets-Sheet 1

INVENTORS
John F. Byrne
William L. Firestone
BY
Norman L. Mueller
Atty.

MULTIPLE FREQUENCY CHANNEL MULTIPLEX COMMUNICATION SYSTEM

Filed June 8, 1953 3 Sheets-Sheet 2

INVENTORS
John F. Byrne
William L. Firestone
BY Norman L. Mueller
Atty.

July 22, 1958 J. F. BYRNE ET AL 2,844,711

MULTIPLE FREQUENCY CHANNEL MULTIPLEX COMMUNICATION SYSTEM

Filed June 8, 1953 3 Sheets-Sheet 3

INVENTORS
John F. Byrne
William L. Firstone
BY
Forman L. Mueller
Atty.

United States Patent Office 2,844,711

Patented July 22, 1958

2,844,711

MULTIPLE FREQUENCY CHANNEL MULTIPLEX COMMUNICATION SYSTEM

John F. Byrne, Elmhurst, and William L. Firestone, Chicago, Ill., assignors to Motorola, Inc., Chicago, Ill., a corporation of Illinois Application June 8, 1953, Serial No. 360,292

3 Claims. (Cl. 250—15)

This invention relates to multiplex communication systems and more particularly to a frequency division multiplex system for providing a large number of channels in a microwave communication system.

Multiplexing arrangements have been used in many different applications to provide a plurality of communication channels over a single wire line or radio system. Various different types of multiplexing systems are used, and the present invention is concerned with systems wherein a wide frequency band is divided to provide a plurality to channels each of which is occupied by a modulated subcarrier wave. In the present system the subcarrier waves are frequency modulated and a plurality of subcarrier waves are then combined and transmitted together over a wide channel.

It is known practice to use subcarrier waves having a frequency between 100 and 1000 kilocycles, with these subcarrier waves being relatively widely spaced with respect to each other. Frequency deviations ranging from plus or minus 6 kilocycles to plus or minus 18 kilocycles have been used depending upon the frequency of the subcarrier wave. In order to prevent interaction between the various subcarriers resulting from cross-modulation and harmonics thereof, the subcarriers must be very carefully positioned in this frequency band and the maximum number of subcarriers which have been satisfactorily used is about twelve. This has not been adequate in certain applications where a larger number of communication channels are required, and problems have arisen in providing a larger number of channels. To extend the frequency range over which the subcarriers are placed has not helped because of the various harmonics and cross-modulation frequencies which interfere with the additional channels.

It is therefore an object of the present invention to provide an improved multiplex communication system wherein a large number of subcarrier channels are provided without interference with each other.

Another object of the present invention is to provide a frequency multiplex communication system wherein the harmonics of the subcarriers, and the frequencies produced by the beating of any two subcarriers does not fall within the band of the subcarrier waves.

A further object of the present invention is to provide a frequency modulation multiplex system wherein distortion is reduced.

A feature of this invention is the provision of a multiplex microwave communication system wherein a large number of subcarrier frequencies are provided, all being included within a single octave.

Another feature of this invention is the provision of a frequency modulation multiplex system for microwave use wherein a large number of channels are provided, with each having a relatively small deviation and with the distortion and noise on each channel also being reduced so that signals furnishing adequate communication are provided on all multiplex channels.

Further objects, features and the attending advantages of the invention will be apparent from a consideration of the following description when taken in connection with the accompanying drawings in which.

In practicing the invention there is provided a multiplex arrangement for microwave communication systems wherein a large number of channels are provided. In this arrangement twenty-four channels are provided, with the subcarrier frequencies being in the octave between 400 to 800 kilocycles. The deviation of each subcarrier is plus or minus 3½ kilocycles providing an overall deviation of 7 kilocycles, and the spacing between the subcarrier channels is 16 kilocycles so that a guardband of 9 kilocycles is provided between the various subcarrier channels. Inasmuch as the subcarriers are all within an octave, neither the sum nor the difference between any two frequencies is within the band being used. Further, all the harmonics of the frequencies used are above the band and therefore there is no interference from either the beat frequencies or harmonics. Although interference may be caused by beat frequencies of three subcarriers or between harmonics of the various subcarriers, these would all be at a lower level and would therefore cause less trouble.

Because of the large number of channels used, the modulation voltage of each channel is relatively low. However, this is counteracted by the fact that the distortion in each channel is less, and therefore the relatively low signal voltages provide adequate communication. The wide band noise is somewhat reduced but not to the extent of the reduction in signal so that there is a resulting decrease in signal to noise ratio. However, because of the decrease in distortion, the overall communication has been found to be satisfactory. This arrangement is particularly applicable for short systems wherein the signal levels are relatively high, and in such cases a large number of channels may be used to thereby provide more communication facilities.

Figure 1:
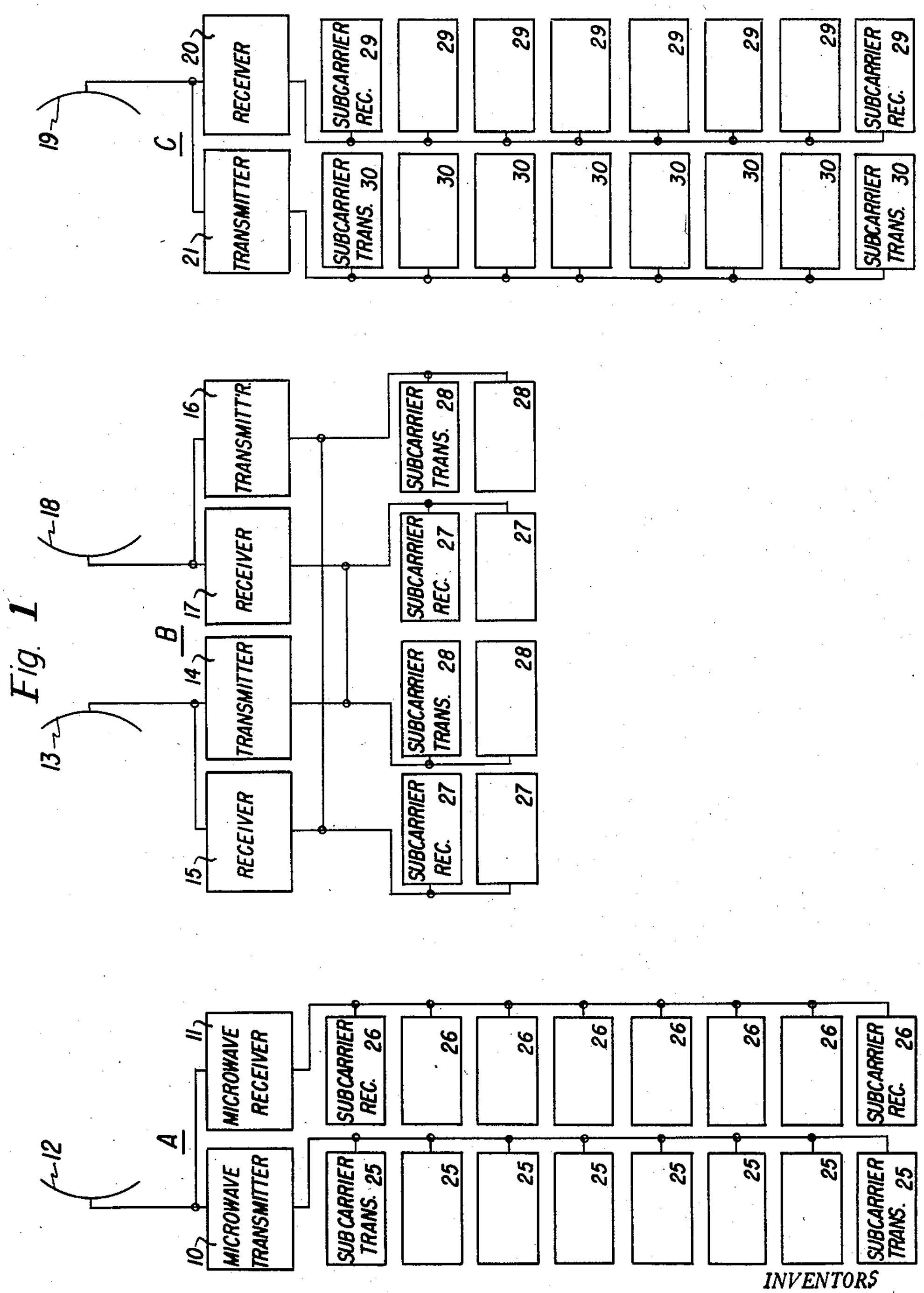
Fig. 1 is a block diagram illustrating the microwave multiplex system in accordance with the invention.

Referring now to the drawings, in Fig. 1 there is illustrated in block diagram form a microwave communication system including a terminal station A, a relay station B, and a terminal station C. The terminal station A includes a microwave transmitter 10 and a microwave receiver 11 which may be coupled to the same antenna 12. The antenna 12 beams a signal to an antenna 13 at the relay station B to which may be coupled a microwave transmitter 14 and a microwave receiver 15. The receiver 15 at the relay station may be coupled to a second transmitter 16 and the transmitter 14 may be coupled to a second receiver 17 which are connected to antenna 18. The antenna 18 is beamed to communicate with the antenna 19 at the terminal station C. This antenna 19 is coupled to receiver 20 and transmitter 21. It is obvious that a plurality of relay stations B may be provided depending upon the distance to be covered by the system between terminals A and C.

The microwave transmitters and receivers are adapted to transmit and receive a frequency modulated wave having a very wide bandwidth. This wave is made up of a plurality of waves from the subcarrier transmitters 25 which are combined in a composite wave. The received wave is applied to a plurality of subcarrier receivers 26 which select the individual subcarrier waves and demodulate them to provide the modulating signals thereon. At the relay station B the composite wave from the receiver 15 may be applied to the transmitter 16 without having the subcarrier waves selected or demodulated, or one or more of the subcarrier waves may be selected from the composite wave at station B by subcarrier receivers 27. If desired, additional subcarrier waves may be applied to the composite waves at station B by the subcarrier transmitters 28. If one wave is taken off and another put on the same channel at a relay station, filtering is required in the connection between the receiver 15 and the transmitter 16 so that this channel is not fed through from the receiver 15 to the transmitter 16. At the terminal station C the received wave is selected and the individual subcarrier waves are selected and demodulated by the subcarrier receivers 29. The signals originating at terminal station C are modulated on subcarrier waves by the subcarrier transmitters 30, with the waves from all transmitters being combined and applied to the transmitter 21.

Figure 2:
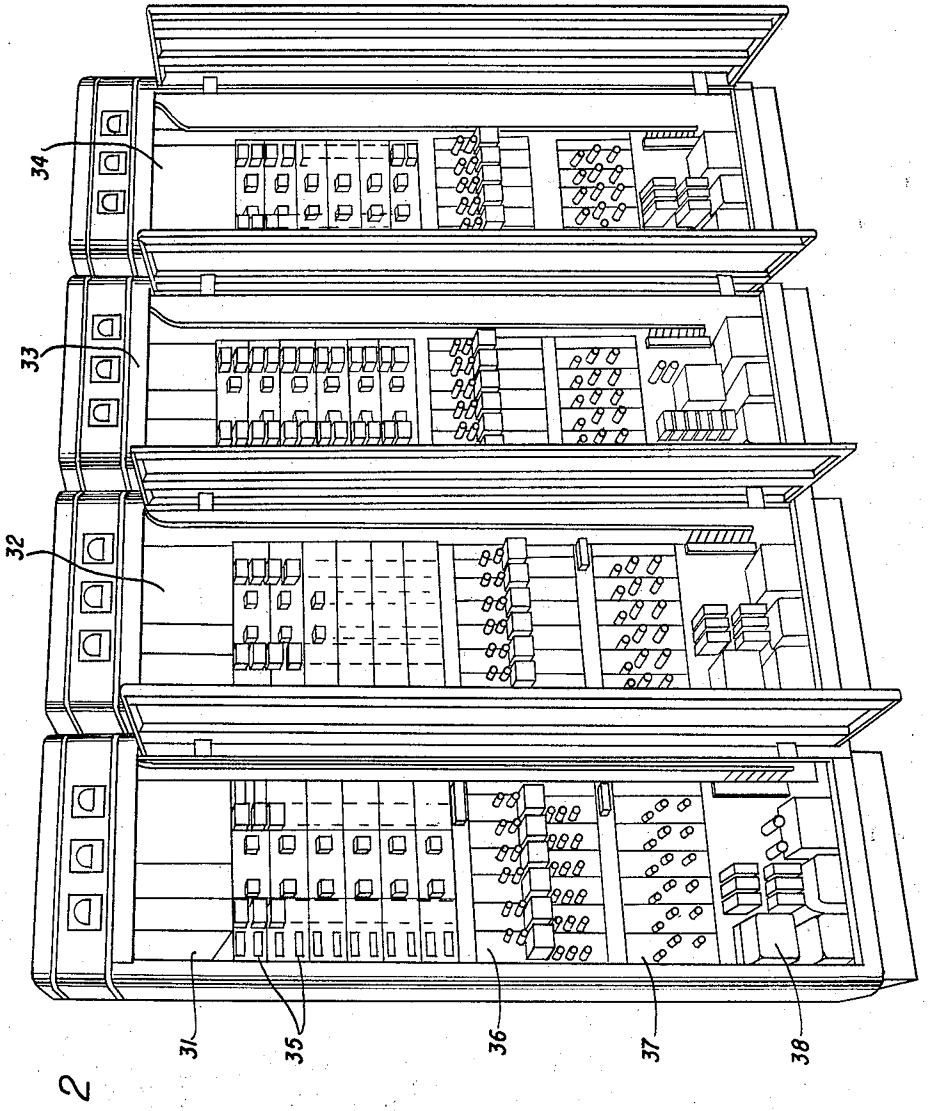
Fig. 2 is a perspective view illustrating the multiplexing equipment at a terminal station.

In Fig. 2 there is illustrated the multiplex equipment required at a terminal station with the equipment being housed in four cabinets marked 31, 32, 33 and 34. These may all be identical and may each include equipment for six subcarrier channels. The equipment required for each channel includes a line termination unit 35, a subcarrier receiver 36 and a subcarrier transmitter 37. Each cabinet includes six line termination units, six subcarrier receivers and six subcarrier transmitters so that the four cabinets provide twenty-four channel operation. At the bottom of each cabinet there is provided a power supply 38 which furnishes the various operating potentials required for the equipment in the cabinet. Meters for indicating various operating conditions are provided at the top of each cabinet.

As previously stated, important advantages have been obtained by providing a plurality of multiplex channels all within an octave. Although various different frequencies can be used, the octave between 400 and 800 kilocycles has been found to be highly satisfactory. It is believed that any octave extending in the frequency range between 300 and 1200 kilocycles can be satisfactorily used. The lower octaves have the disadvantage that the bandwidth thereof is smaller, being only 300 kilocycles in the octave between 300 and 600 kilocycles. The higher octaves such as from 600 to 1200 kilocycles, although providing a wider frequency band, have the disadvantage that the microwave noise increases with the subcarrier frequency. Therefore, the octave from 400 to 800 kilocycles has been found to be optimum, although as stated above it is believed that other octaves in the range specified can be satisfactorily used in certain applications.

When using a large number of channels within a single octave, it is necessary to hold the spacing of the channels to a minimum which may be of the order of 20 kilocycles or below. This requires very stable operation of the subcarrier transmitters, and necessitates the use of small deviations of plus or minus 4 kilocycles or less. In operation in the octave between 400 and 800 kilocycles, operation with channels of 16 kilocycles with a deviation of plus or minus 3½ kilocycles has been found to be satisfactory. The receivers must be highly selective to select the subcarrier wave, and must be highly sensitive as the signal is at a lower level than if greater bandwidth was available. As stated above, the reduction in modulation deviation results in a reduction in the frequency modulation improvement factor and therefore a reduction in the signal-to-noise ratio. This, however, is partly compensated for by the fact that the wide band noise is also reduced because of the reduction in the bandwidth of each channel, and further by the fact that the distortion is substantially reduced as compared to that produced from wider bandwidths. This is because the distortion is made up of such a large number of different beat frequencies that it takes the form of overall noise which is less objectional than large amplitude spaced beats.

Figures 3, 4, 5, 6:
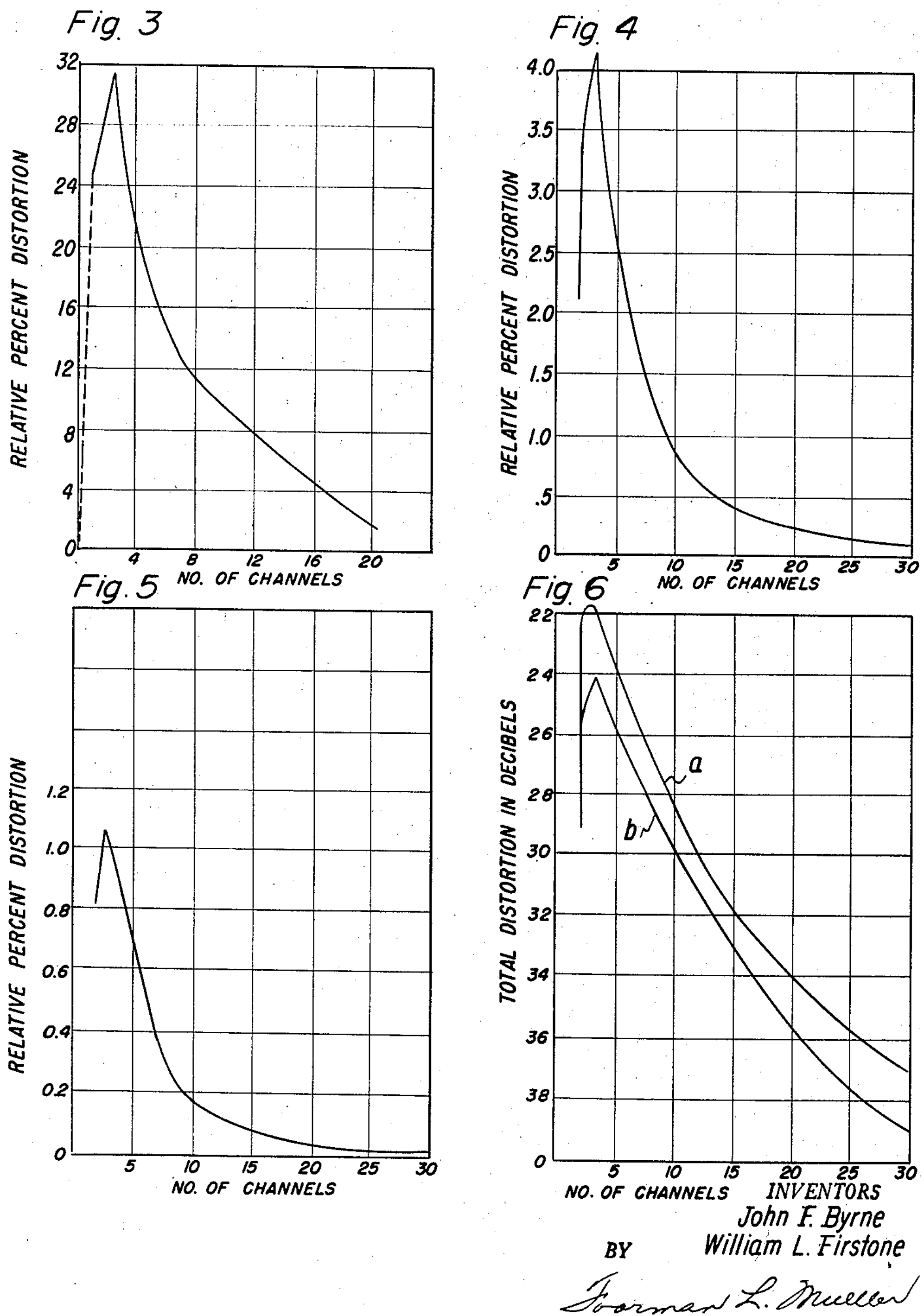
Fig. 3 is a curve illustrating the second order distortion in frequency multiplex systems.
Fig. 4 illustrates the third order distortion.
Fig. 5 illustrates the fourth order distortion.
Fig. 6 illustrates the decibel distortion resulting from the third order term.

The reduction of the distortion is illustrated in Figs. 3 to 5 inclusive. Fig. 3 shows the distortion resulting from second order terms such as second harmonic frequencies of the subcarrier waves and beat frequencies resulting from the combination of two subcarrier waves. That is, the sum or difference of two subcarrier waves. As previously stated, when all of the subcarrier waves are within an octave, the second order terms all disappear and therefore distortion from second order terms is eliminated.

Fig. 4 shows the distortion resulting from third order terms. It will be noted that the third order distortion per channel, like the second order distortion, decreases with the number of channels and is relatively low when twenty-four channels are used as has been proposed. It will be apparent from the comparison of the vertical scales used in Figs. 3 and 4 that the third order distortion is much lower than the second order distortion and is therefore much less objectionable.

Fig. 5 illustrates the fourth order distortion which is very much less than the third order distortion and is insignificant as compared to the second order distortion. Distortion of an order higher than fourth is correspondingly reduced and is of no importance. It will therefore be noted by a comparison of Figs. 3 to 5 that the distortion per channel in the system wherein a very large number of channels is used, with all the channels being within an octave, is much less than the distortion per channel resulting from systems wherein the channels are spaced from each other in a wider band which covers more than an octave, as in the latter case high amplitude second order distortion is encountered. That is, even though a smaller number of channels are used which are widely spaced, the distortion of this system is greater than that of the proposed system because of the relative significance of distortion of the various orders.

The curves of Figs. 3, 4 and 5 represent the distortion which would be produced if all of the possible distorting terms which might fall within an octave actually do fall within the octave. It is to be pointed out, however, that in the usual case all of these distorting terms do not appear in the octave. Fig. 6, which is plotted to show the total decibel power distortion for third order terms, indicates by the curve *a* the distortion which would be produced if all possible terms were present, and by the curve *b* the distortion resulting from terms which would probably be present. Fig. 6 is drawn to show the power distortion which would be produced by third harmonic voltage distortion of 10 percent. The vertical scale indicates the level of the distortion below the signal power.

It is to be pointed out that in practical systems the third harmonic voltage distortion will generally be much less than 10 percent, with 3 percent about the maximum probable, and accordingly the decibel distortion will be reduced by about 10 decibels. Actually, in well designed systems the third harmonic voltage distortion will be below 1 percent so that the power distortion will be 20 decibels below the curve shown. Considering for example a 20-channel system, the distortion resulting from all possible distorting terms as indicated by curve *a* would be 34 decibels below the signal. The probable distortion as indicated by curve *b* will be 35.5 decibels. However, for a maximum voltage distortion of 3 percent the power distortion would be down to 45 decibels, and for an average third harmonic voltage distortion of 1 percent the power distortion would be further down to 55 decibels.

It is therefore seen from the above that to eliminate all second order distortion results in a very great reduction of the over-all distortion in a system. Accordingly, the multiplexing system wherein all channels are included within an octave has important advantages as to reduction in distortion. These advantages permit satisfactory reception of signals at low level so that reduction in band width causing a reduction in signal-to-noise ratio may be tolerated. This permits close spacing of channels so that a large number of channels can be provided in an octave.

Although there has been described a certain embodiment of the invention which is illustrative thereof, it is obvious that various changes and modifications can be made therein without departing from the intended scope of the invention as defined in the appended claims.

We claim:

1. In a frequency division multiplex communication system, a plurality of at least 20 frequency modulation subcarrier transmitters individually modulated by signals to be transmitted, said subcarrier transmitters having center frequencies substantially uniformly spaced within a frequency range which has an upper limit two times the lower limit thereof, which frequency range extends between 300 and 1200 kilocycles, said subcarrier transmitters providing frequency modulated waves having deviations of the order of 7 kilocycles, means for combining the waves from said subcarrier transmitters into a composite wave, wide band microwave transmitting means for transmitting said composite wave, and receiving means for receiving said composite wave, said receiving means including portions for selecting the individual subcarrier waves and for deriving the modulating signals therefrom, with the noise and distortion of the system being reduced by the close spacing of the frequency modulated waves.

2. In a frequency division multiplex communication system, a plurality of frequency modulation subcarrier transmitters individually modulated by signals to be transmitted, said subcarrier transmitters having center frequencies substantially uniformly spaced within a frequency range which has an upper limit two times the lower limit thereof, which frequency range extends between 300 and 1200 kilocycles, said subcarrier transmitters providing modulated waves on adjacent frequencies spaced from each other by the order of 20 kilocycles, with the deviation of the subcarrier wave from each subcarrier transmitter being less than half the spacing between adjacent subcarrier frequencies and being reduced with respect to the deviation which provides optimum signal-to-noise ratio, means for combining the waves from said subcarrier transmitters into a composite wave, and wide band microwave transmitting means for transmitting said composite wave, with the distortion of the system being reduced by the close spacing of the frequency modulated waves to compensate for the reduced signal resulting from the reduced deviation of the subcarrier waves.

3. In a frequency division multiplex communication system, a plurality of frequency modulation subcarrier transmitters individually modulated by signals to be transmitted, said system including at least 20 subcarrier transmitters having center frequencies substantially uniformly spaced within a band of frequencies having an upper limit two times the lower limit thereof, which band of frequencies is of the order of 400 to 800 kilocycles, said subcarrier transmitters being constructed to provide deviation of each subcarrier wave less than half the spacing between adjacent center frequencies and less than that providing optimum signal-to-noise ratio, means for combining the waves from said subcarrier transmitters into a composite wave, wide band microwave transmitting means for transmitting the composite wave, relay means for receiving and retransmitting said composite wave, and receiving means for receiving said composite wave, said receiving means including portions for selecting the individual subcarrier waves and for deriving the modulating signals therefrom, with the distortion of the system being reduced by the close spacing of the frequency modulated waves to compensate for the reduced signal resulting from the small deviation of the modulated waves.

References Cited in the file of this patent

UNITED STATES PATENTS

| | | |
|---|---|---|
| 1,910,977 | Weis | May 23, 1933 |
| 2,233,183 | Roder | Feb. 25, 1941 |
| 2,298,409 | Peterson | Oct. 13, 1942 |
| 2,421,727 | Thompson | June 3, 1947 |
| 2,514,425 | Thompson | July 11, 1950 |
| 2,691,065 | Thompson | Oct. 5, 1954 |